Jan. 13, 1931. J. W. SMITH 1,789,277
SPRING END CONNECTION
Filed June 9, 1928
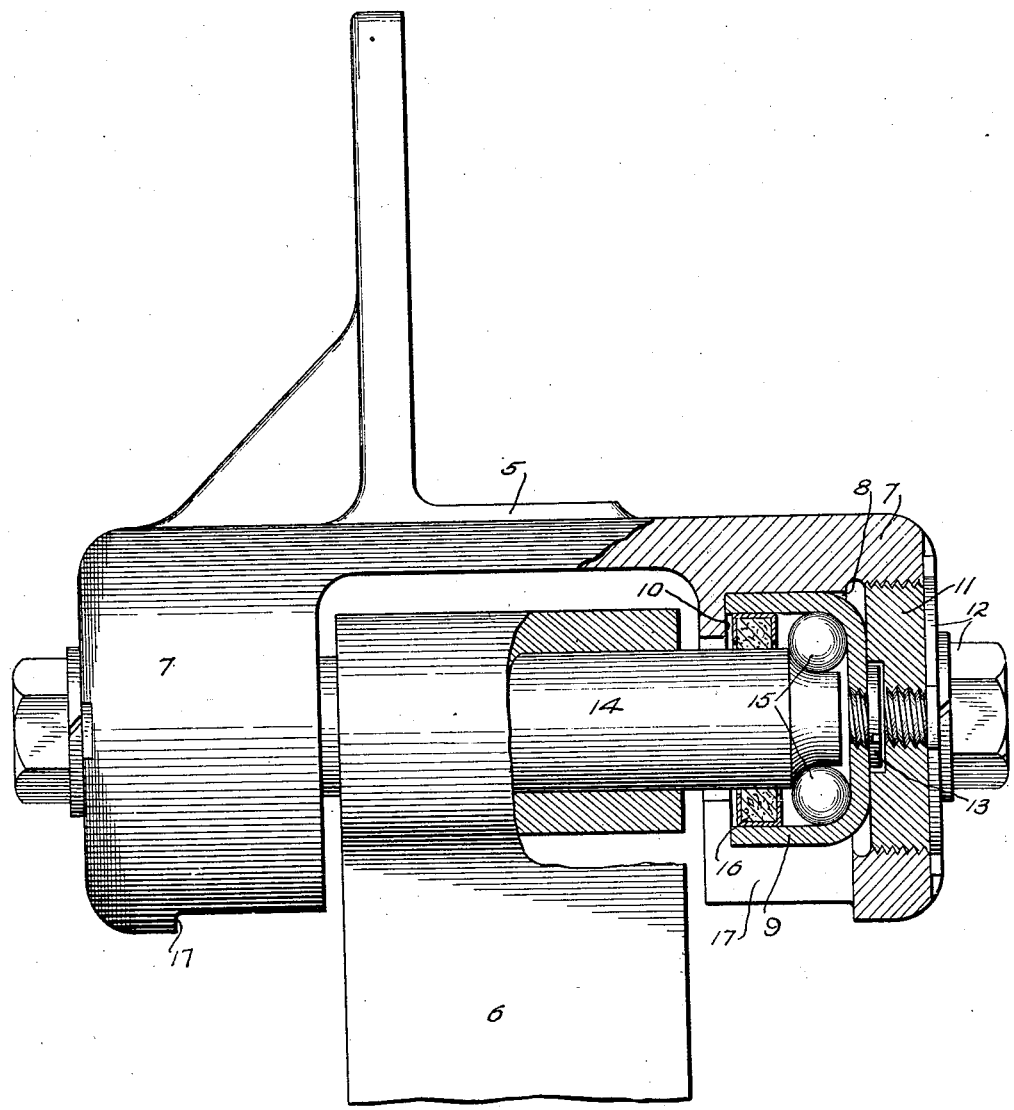
INVENTOR
John W. Smith
BY
Mitchell Bechert
ATTORNEYS.

Patented Jan. 13, 1931

1,789,277

UNITED STATES PATENT OFFICE

JOHN W. SMITH, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING-END CONNECTION

Application filed June 9, 1928. Serial No. 284,190.

My invention relates to a spring end connection for connecting a vehicle frame and spring.

It is an object of the invention to provide a spring and connection which is simple in construction, easy and cheap to manufacture, which may be readily assembled and disassembled. In general the object is to provide an improved spring end connection for vehicles.

Briefly stated, in the preferred form of the invention I provide spaced apart bosses which may be part of a frame or spring, but are preferably formed on a separate bracket to be attached to a frame or spring, preferably to the frame. The other member, as the spring, is provided with bearing means, for example a pin, the ends of which may extend into the spaced apart bosses. Antifriction bearing members, such as balls or rollers are interposed between the bearing members such as the pin ends and complementary members seated in said bosses. The complementary bearing raceways seated in the bosses are definitely spaced apart by means such as a shoulder portion within the bosses, so that when the bearing members in the bosses are forced up to the shoulders or other abutments, the antifriction bearing members will be seated with the requisite tightness.

In the drawing I have shown, for illustrative purposes only, a preferred embodiment of the invention. The drawing illustrates an end view of the bracket or frame and spring connected together, parts being shown in section the better to illustrate the construction.

In said drawing, 5 indicates a bracket forming part of or to be secured to one member such as a vehicle frame, while 6 indicates the other member to be connected (in this case the spring). The bracket 5 is provided with spaced apart bosses 7—7 having seats such as 8 therein for the reception of antifriction bearing member raceway means, which may be of any suitable form and construction, such as the simple cups 9. The bearing seats 8 preferably constitute counterbores leaving definite abutments or shoulders as 10 against which the antifriction bearing member raceways 9, or any means carrying such raceways may abut. Each raceway 9 is held in place in its boss by a suitable means such as a plug 11 screw-threaded into the boss. If desired any suitable type of lock nut 12 may be provided for preventing accidental withdrawal of the plug 11.

In order to permit ready removal of the bearing cup 9, I may provide an aperture therein into which a tool may be inserted to facilitate withdrawal of the cups. Normally, such an aperture would be closed by a plug 13 to prevent the escape of lubricant with which the bearing cup is usually filled.

The spring 6 carries means, for example a pin 14 having projecting ends which extend into the bosses 7—7. Antifriction bearing members such as balls 15—15 are interposed between the projecting ends of the pin 14 and the raceways as 9 held in the bosses 7. In the form shown, the raceways of the pin 14 are formed directly upon the ends of the pin, and the latter is secured in the spring eye by any suitable means (not shown), or by means of a shrink fit. A dust ring 16 may be provided for excluding dust from and retaining lubricant in the bearing.

The bosses 7—7 may be provided with slots 17—17 to permit the transverse insertion of the pin 14 into the position shown.

In assembling the device, the pin 14, together with the spring end, may be moved up substantially to the position shown in the drawing. The raceways 9 are then inserted endwise over the pin ends and the plugs 11 are screwed up so as to cause the bearing cups 9 to engage the bottom of the counterbore, that is, the shoulder 10. The locking means 12 may then be set up.

All of the parts may be manufactured under factory supervision permitting interchangeability of parts. The distance between the shoulders or abutments 10 in the two bosses 7—7 may be definitely fixed. By accurately making the cups 9—9, the distances between the raceways will be definitely determined. The bearing member raceways on the pin 14 or other bearing means carried by the spring may be definitely determined. Thus, when the device is assembled, for example as shown in the drawings, the antifriction bearing members will be seated on complementary raceways with just the desired tightness. Obviously, by making all parts the same, free interchangeability is possible, thus making for quantity production and cheapening costs.

While the invention has been described in considerable detail, I do not wish to be strictly limited to the form shown, since changes may be made within the scope of the invention as defined in the appended claims.

I claim:

1. In a spring end connection, a bracket having spaced apart bosses thereon with aligned bores therein, transverse flanges in said bores and defining the bottoms thereof, pin means to be secured to a spring and extending beyond the sides thereof and into said bores, said pin means having bearing seats formed directly thereon, bearing cups insertable axially into said bosses and over the seats on said pin means, antifriction bearing members interposed between said seats and bearing cups, securing means for holding said bearing cups in said bores and in abutting relation with said transverse flanges to definitely space said bearing cups a single definite distance apart, the seats on said pin means being spaced a single definite distance apart such that the antifriction bearing members engage said seats and cups with the desired fit, said bearing cups being immediately removable from said bores upon release of said securing means.

2. In a spring end connection, a bracket having spaced apart bosses thereon with aligned bores therein, transverse flanges in said bores and defining the bottoms thereof, pin means to be secured to a spring and extending beyond the sides thereof and into said bores, said pin means having bearing seats formed directly thereon, bearing cups insertable axially into said bosses and over the seats on said pin means, antifriction bearing members interposed between said seats and bearing cups, securing means for holding said bearing cups in said bores and in abutting relation with said transverse flanges to definitely space said bearing cups a single definite distance apart, the seats on said pin means being spaced a single definite distance apart such that the antifriction bearing members engage said seats and cups with the desired fit, said bearing cups being immediately removable from said bores upon release of said securing means, and means carried by said securing means for holding the same in place relatively to said bosses.

JOHN W. SMITH.